May 11, 1965     B. J. SUNDBERG     3,182,387
FILTER FABRICATING APPARATUS
Filed Aug. 13, 1962     2 Sheets-Sheet 1
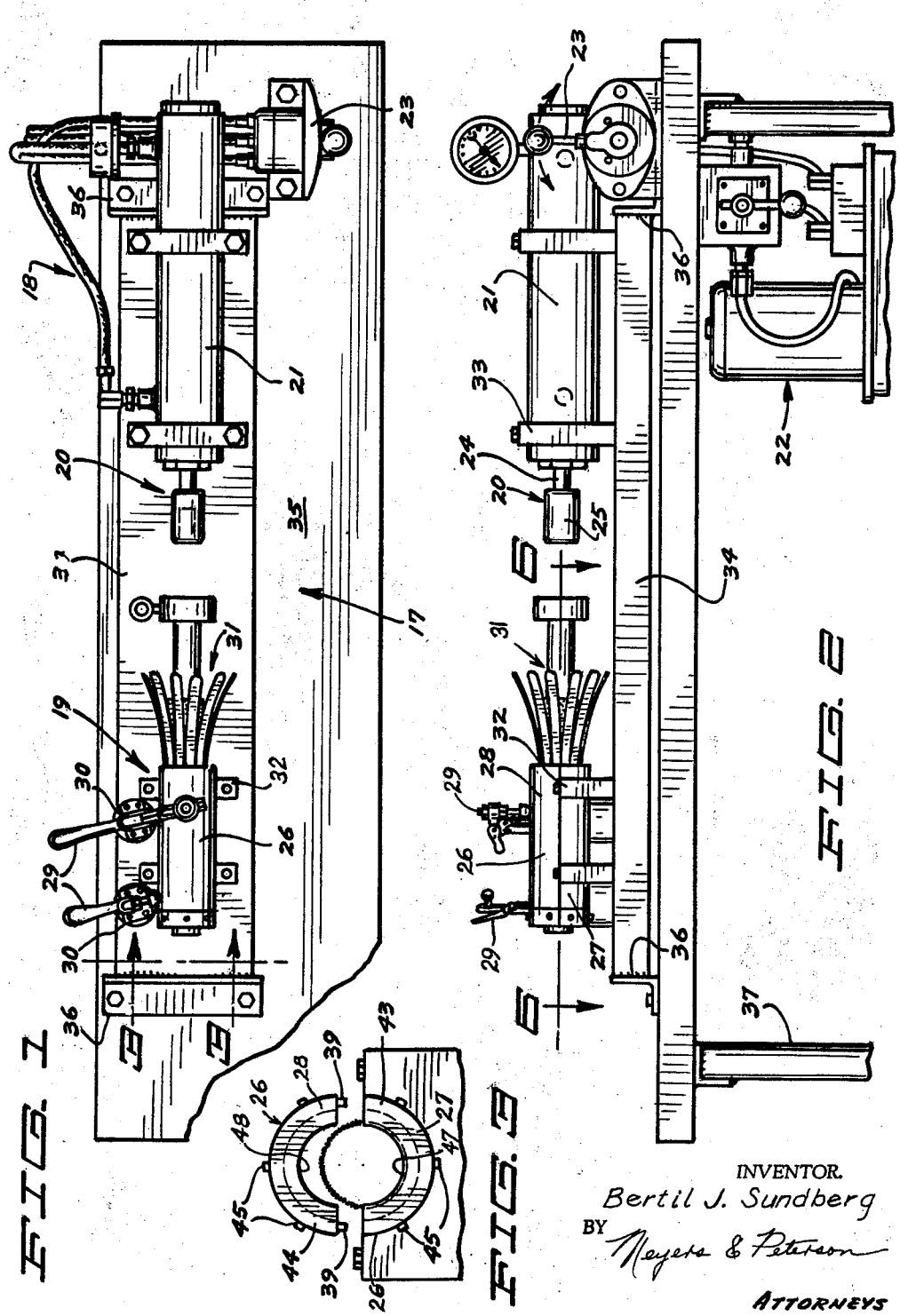
INVENTOR.
Bertil J. Sundberg
BY
ATTORNEYS

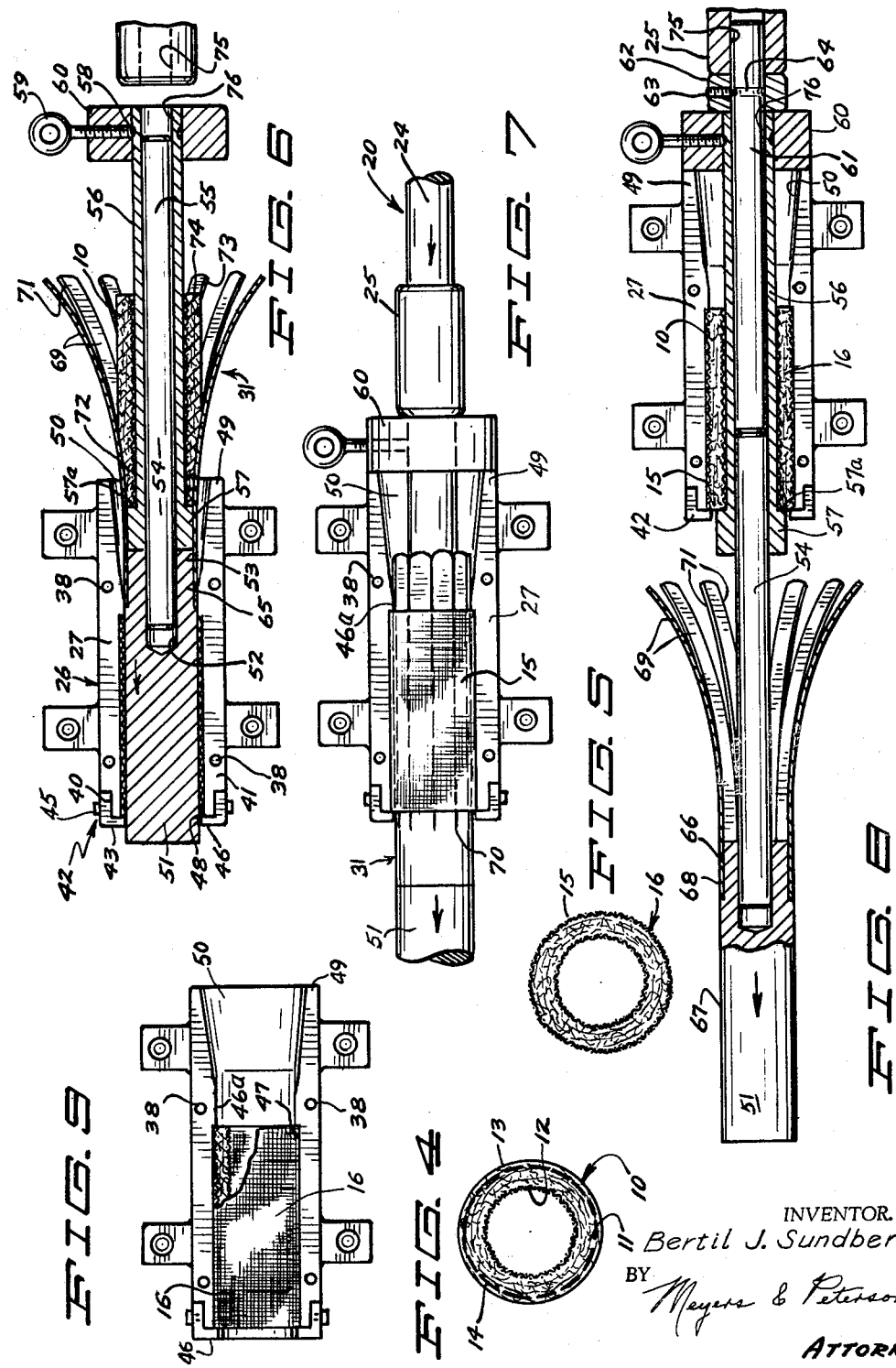

United States Patent Office 3,182,387
Patented May 11, 1965

3,182,387
FILTER FABRICATING APPARATUS
Bertil J. Sundberg, Minneapolis, Minn., assignor to G. H. Tennant Company, Minneapolis, Minn., a corporation of Minnesota
Filed Aug. 13, 1962, Ser. No. 216,521
7 Claims. (Cl. 29—234)

This invention relates to filter fabricating apparatus and more particularly to apparatus for inserting a filter element into a preformed confining sheath.

An object of this invention is to provide an apparatus for axially inserting an expandable filter core into a preformed sheath.

More specifically, it is another object of this invention to provide an apparatus which will compress the filter core circumference in equal amounts therearound simultaneously and progressively from one end of the filter to the other as it is being inserted within the sheath.

A further object is to provide a structure as set forth above that is simple to construct and operate and which is relatively inexpensive.

These and other objects and advantages of my invention will more fully appear from the following description, made in connection with the accompanying drawings, wherein like reference characters refer to the same or similar parts throughout the several views and in which:

FIGURE 1 is a top view of the filter fabricating apparatus;

FIGURE 2 is a front view of FIGURE 1;

FIGURE 3 is an enlarged end view of the mold block as shown by line 3—3 in FIGURE 1;

FIGURE 4 is an end view of a filter core prior to its being compressed and inserted into a filter sheath;

FIGURE 5 is a similar end view of a filter after it is placed within a sheath;

FIGURE 6 is an enlarged cross sectional top view taken from FIGURE 2 on line 6—6 and having the fabricating apparatus components in a preliminary position;

FIGURE 7 is a similar view to that of FIGURE 6 but showing the apparatus in an intermediate position;

FIGURE 8 is a similar view to that of FIGURE 7 but having the apparatus components in a final position. In this view an added plunger rod is also shown; and FIGURE 9 is also a view similar to that of FIGURE 6 but showing only the mold with a finished filter assembled and positioned therein.

Referring specifically to FIGURE 4, a filter core referred to generally as 10 is shown which has a filter portion 11 secured to and encircling a wire mesh screen 12 which supports the inside diameter of the filter. In the fabrication of the filter core 10, the filter fibers will be loosely packed so that consequently the outside circumference 13 will be fairly expanded. Through the utilization of the apparatus to be set forth subsequently, the outside circumference 13 will be compressed to the circumference represented by the dashed line 14. When the filter core is thus compressed, it may be inserted axially within an outer wire screen sheath 15 as shown in FIGURE 5, whereafter, the filter referred to generally as 16, is ready for use.

With reference now particularly to FIGURES 1 and 2, the apparatus for inserting the filter core 10 within the wire screen sheath 15 will be set forth. The filter fabricating apparatus referred to generally as 17 consists principally of a driving system referred to generally as 18 and an insertion apparatus referred to generally as 19. The driving system 18 consists in turn of an air pressure means for driving a ram 20 axially toward the insertion apparatus 19. As seen in both FIGURES 1 and 2, the driving system has an air cylinder 21 which is supplied with compressed air from a compressor mechanism 22. Depending upon the direction in which the ram 20 is to be moved, a three position air control lever 23 is provided. Referring to FIGURE 2, when the lever is moved to the left of its neutral position, the ram 20 will also move to the left, and when the lever is moved to the right, the ram 20 would be withdrawn away from the insertion apparatus and the ramrod 24 withdrawn back into the air cylinder 21. Also forming a part of the ram is a ram head 25 secured to the end of the ramrod 24.

The insertion apparatus 19 consists principally of an open-ended cylindrical mold 26 which, as seen in FIGURE 3, is made up of two half shells 27 and 28. Since the upper shell 28 is free to be removed from the lower shell 27, as shown in FIGURE 3, a pair of over-center type clamps 29 are provided to firmly hold the shells together during the filter fabricating process. The clamps 29 are mounted on individual clamp posts 30 as seen in FIGURE 1.

Finally, an inserting mechanism referred to generally as 31 forms part of the insertion apparatus 19. The inserting mechanism will be explained subsequently in greater detail.

Both the insertion apparatus and driving system are secured by means of mold clamps 32 and air cylinder clamps 33, respectively, to a machine bed 34. The machine bed 34 in turn is secured to a table or counter 35 by means of end brackets 36. As seen in FIGURE 2, the table 35 is supported by legs 37 in a usual manner.

Referring to FIGURES 6–9 now, the inserting mechanism 31 will be described in greater detail with respect to its cooperation with the open-ended cylindrical mold 26. The mold 26, as previously explained, has lower and upper half shells 27 and 28, respectively. As seen in FIGURE 6, the lower shell 27 is provided with guide holes 38 which receive the guide pins 39 of the upper shell 28 (see FIGURE 3). By providing this alignment means, the two shells will be perfectly matched when clamped together. Secured to the annular recess 40 at the exit end 41 of the mold 26 is an annular sheath stop 42. Again, the sheath stop is divided into two semi-circular portions, one of which attaches to each of the half shells 27 and 28. Both the lower sheath stop 43 and the upper sheath stop 44 are secured to the annular recess 40 by means of bolts 45. Each of the sheath stop elements 43 and 44 has a lip portion 46 which extends radially inward beyond the inside wall 47 (see FIGURE 9) of the mold shells 27 and 28 and defines an annular bore 48 through which a cylindrical block is journaled for axial advancement, as will be explained shortly.

As noted in each of FIGURES 6–9, the entrance end 49 of each of the upper and lower shell members is provided with an annular tapered opening 50 against which the inserting mechanism coacts in sliding convergence to effect a uniform and smooth compression on the filter element 16. The lip 46, which extends inwardly of inner wall 47 of the mold, provides an annular abutment against which the one end of the wire screen sheath 15 is seated to prevent axial movement thereof. Similarly, an annular abutment 46a is formed on the mold shells 27 and 28 to abut the other end of sheath 15 and to provide a guide and stop for the inserting mechanism.

With reference to FIGURES 6, 7 and 8, the inserting mechanism consists principally of a cylindrical block 51 which has a bore 52 axially positioned therein at the rearward end 53. Positioned within the bore 52 is a guide shaft 54 which may be simply secured by a pressed fit. Slidably journaled upon the rearwardly extending portion 55 of the shaft 54 is a tubular mandrel 56 that terminates at its forward end in a collar 57 having a shoulder 57a. Positioned adjacent the rearward end of the mandrel 56 is an annular recess or screw channel 58 which cooperates with a thumb screw 59 for securing a bumping block 60 in precise position thereto. Also included in the inserting mechanism 31, and slidably received in the tubular mandrel 56, is a separable plunger rod 61 which has a bushing 62 secured thereto by means of a set screw 63 acting in cooperation with an annular screw channel 64. The plunger rod and its elements are clearly shown in FIGURE 8.

Referring again specifically now to FIGURES 6 and 8, the cylindrical block 51 has a recessed neck 65 formed at the rearward end 53. This recessed neck is defined by an outer circumferential surface 66 which is only slightly smaller in diametrical dimension than the outer surface 67 of the cylindrical block 51. Secured as by welding around the recessed neck 65 is a thin cylinder of spring metal 68 which has a plurality of slits or cuts extending for a substantial length through the rearward portion and along the longitudinal dimension thereof. These longitudinal cuts form a plurality of spring leaf compression fingers 69. As seen in FIGURE 7, each longitudinal cut starts at a point 70 which is adjacent the rearward end 53 of the cylindrical block 51. Referring to FIGURES 6 and 8, each of the spring leaf compression fingers is defined by side edges 71.

With reference to FIGURES 6, 7, 8 and 9, the fabrication process of a filter will now be set forth. Initially, the inserting mechanism 31 is totally removed from the mold 26. The upper shell 28 is removed and a wire screen sheath 15 is placed within the mold, as shown in FIGURE 6, with one end thereof resting against the lip portion 46 of the lower sheath stop 43. Next, the cylindrical block 51 with its guide shaft 54 is axially inserted through the entrance end 49 of the lower half shell 27 and positioned as shown in FIGURE 6 within the wire screen sheath 15 and with the forward end slightly journaled through the lower sheath stop 43. It might be pointed out that an alternative procedure up to this point could be to slip the sheath 15 over the cylindrical block 51 prior to the insertion of these elements into the lower half shell 27. However, once the elements are so positioned upon the lower shell 27 and firmly secured thereto through use of the clamps 29.

With the mandrel 56 removed from the free portion 55 of guide shaft 54 and the bumping block 60 removed also from the mandrel, the filter core 10 (see FIGURE 4) is axially slid upon the mandrel until it is seated against the shoulder 57a. The bumping block 60 is then secured to the mandrel and the mandrel then axially journaled or slid upon the guide shaft 54 to the position shown in FIGURE 6 where the collar 57 of the mandrel abuts the rearward end 53 of the cylindrical block 51. In the course of this procedure, the filter core 10 will be partially compressed at the forward end 72 by the compression fingers 69 as shown. When the filter core is thus positioned, it is seen that the outer ends 73 of the compression fingers 69 will slightly overlap the outer end 74 of the filter core thus assuring compression of the filter core over its entire length as will become apparent shortly.

With the elements thus positioned, as previously explained, the operator of the filter fabricating apparatus operates the air control lever 23 (see FIGURES 1 and 2) whereby the ram 20 will be forced against the bumping block 60. This action will cause the mandrel to exert an axial force upon a cylindrical block thus pushing the cylindrical block, as well as the spring leaf compression fingers 69, through the wire screen sheath 15. As the inserting mechanism 31 is moved through the mold and screen sheath, the tapered opening 50 of the mold will cause the compression fingers 69 to force down upon the filter core and compress the same to a circumference shown by dashed line 14 of FIGURE 4. It will readily be recognized that this manner of compressing the core will provide equal radial force inward upon the core for the entire circumference and as the core moves through the mold will be so compressed over its entire longitudinal length.

FIGURE 7 shows the elements in their intermediate position wherein the mandrel 56 has been forced the full limit into the mold whereby the bumping block abuts against the entrance end 49 of the mold thereby stopping any further movement. It is noted that in this position the core has been compressed for its entire length since the compression fingers 69 are all compressed to a relative position which allows movement thereof through the wire screen sheath 15.

Referring to FIGURE 8, it is more clearly seen that with the bumping block 60 in abutment with the mold 26, the shoulder 57a of the mandrel 56 is positioned adjacent the extreme end of the sheath 15. Thus, the filter core 10 has been caused to freely move axially within the sheath to the final desired position.

Once the inserting mechanism 31 is positioned as shown in FIGURE 7, the operator reverses the air control lever 23 whereby to withdraw the ram from contact with the bumping block 60. With the ram withdrawn, a plunger rod 61, previously mentioned, is partially inserted within a bore 75 of the ram head 25. With the plunger rod so positioned and the bushing 62 positioned adjacent the ram head 25, the operator again swings the air control lever to the original first position whereby to force the ram toward the inserting mechanism 31 again. This time, however, instead of the ram head bearing against the bumping block 60, the plunger rod 61 is projected into the inner bore 76 of the mandrel whereby to axially abut against the guide shaft 54 and thereby force the cylindrical block 51 and the compression fingers 69 from within the mold 26. As the leaf compression fingers 69 are frictionally withdrawn, it will be noticed that the sheath stop 42 will prevent the sheath 15 from axially sliding along with the compression fingers 69, and the shoulder 57a of collar 57 on the mandrel will prevent the filter core from likewise moving axially with the compression fingers. By so positioning the filter core 10 with respect to the sheath 15, the components thereof will be in proper position after the compression fingers are removed from therebetween. It will be noted that since the filter core was compressed sufficiently so that the compression fingers 69 could pass between the filter core and the sheath 15, the filter core 10, once the spring compression fingers are removed, will expand radially outward a very slight amount until it is confined to the diameter of the sheath 15. In this manner, a tight bond will be provided between the two elements of the filter and relative axial movement therebetween will be prevented.

At this point, the operator again reverses the air control 23 to withdraw the ram, as well as plunger rod 61, from the mold area. After the upper half shell 28 is removed from the mold and thumb screw 59 is released to allow removal of bumping block 60, the mandrel 56 may then easily be axially withdrawn through the filter core whereby to remove the same. The final product thereafter will appear as shown in FIGURE 9 and the operator may then simply remove the completed filter from the lower half shell 27 of the mold.

It will, of course, be understood that various changes may be made in the form, details, arrangements and proportions of the parts without departing from the scope of my invention as set forth in the appended claims.

What is claimed is:

1. Apparatus for inserting a filter core in a retaining sheath comprising:
 (a) a mold adapted to hold a confining sheath into which a filter core is to be inserted,
 (b) said mold having a tapered opening at one end of said mold and an open exit at the other end of said mold,
 (c) an inserting mechanism having a cylindrical block and a guide shaft axially and fixedly secured to said cylindrical block at one end thereof, said mechanism being adapted for axial movement through said mold and filter core, (d) a plurality of outwardly flared compression fingers secured to said end of said cylindrical block and extending rearwardly to overlying said guide shaft in spaced relation thereto, (e) said inserting mechanism also having a mandrel mounted for axial movement upon said guide shaft, (f) said mandrel being adapted to receive a filter core in contact with the outside cylindrical surface thereof and inwardly of said compression fingers, and (g) driving means for advancing said insertion mechanism into said mold whereby said compression fingers will frictionally engage said tapered opening and then evenly compress the outer circumference of said filter core radially inward simultaneously with the advancement of said filter core to a final position within said sheath.

2. Apparatus for inserting a filter core in a retaining sheath comprising:

(a) a mold adapted to hold a confining sheath into which a filter core is to be inserted, (b) said mold having a tapered opening at one end of said mold and an open exit at the other end of said mold, (c) an inserting mechanism having a cylindrical block and a guide shaft axially and fixedly secured to said cylindrical block at one end thereof, said mechanism being adapted for axial movement through said mold and filter core, (d) a plurality of outwardly flared compression fingers secured to said end of said cylindrical block and extending rearwardly to overlying said guide shaft in spaced relation thereto, (e) said inserting mechanism also having a mandrel mounted for axial movement upon said guide shaft, (f) said mandrel being adapted to receive a filter core in contact with the outside cylindrical surface thereof and inwardly of said compression fingers, (g) driving means for advancing said insertion mechanism into said mold whereby said compression fingers will frictionally engage said tapered opening and then evenly compress the outer circumference of said filter core radially inward simultaneously with the advancement of said filter core to a final position within said sheath, and (h) means for advancing said compression fingers from around said filter core after said core is positioned within said sheath, whereby said filter core will be allowed to expand radially outward to the confines of said sheath..

3. Apparatus for inserting a filter core in a retaining sheath as set forth in claim 2 wherein said means for advancing said compression fingers from around said filter core comprises a plunger rod which is adapted to be placed between the guide shaft of said inserting mechanism and said powered driving means after said filter core has been initially driven to its position within said sheath.

4. Apparatus for inserting a compressible cylindrical filter core into a screen sheath having a smaller inside diameter than the uncompressed diameter of said core comprising:

(a) means for encircling said screen sheath to retain said sheath in a longitudinally fixed position and forming a wall with a cylindrical opening at one end having a diameter equal to the inside diameter of said screen;

(b) a cylindrical block having a diameter also equal to the inside diameter of said sheath and a recessed neck formed at one end having a slightly smaller diameter;

(c) a thin cylinder circumscribing said neck and fixedly secured thereto, said thin cylinder having an outside diameter also equal to the inside diameter of said sheath, (d) said thin cylinder having a plurality of spring leaf compression fingers projecting longitudinally therefrom, and (e) a mandrel having a tubular portion formed with a diameter so as to permit said filter core to be placed thereon, (f) said mandrel having a collar provided with a diameter equal to that of said neck, (g) whereby said collar can be forced against the end of said neck to move said cylindrical block completely through said screen sheath, sufficient movement causing the wall of said cylindrical opening to press said spring fingers against said filter core to progressively compress said core as said core is advanced to a position within said sheath.

5. Apparatus for inserting a compressible cylindrical filter core into a screen sheath as set forth in claim 4 including:

(a) means for stopping movement of said mandrel to a position such that the ends of the filter core are aligned with the ends of said screen sheath when said mandrel is stopped.

6. Apparatus for inserting a compressible cylindrical filter core into a screen sheath as set forth in claim 5 in which said stopping means includes:

(a) a bumper block fixedly disposed on the end of said mandrel remote from said collar, (b) said bumper block engaging a portion of said retaining means when the ends of said core and sheath are aligned.

7. Apparatus for inserting a compressible cylindrical filter core into a screen sheath as set forth in claim 6 including:

(a) a guide shaft projecting from said neck of a size to fit within said mandrel so that a rod can be inserted into said mandrel at the end thereof adjacent said bumper block for forcing the neck of the cylindrical block and the spring fingers completely through said filter core to remove same from said retaining means.

References Cited by the Examiner

UNITED STATES PATENTS

| 201,096 | 3/78 | Cowles | 29—234 |
|---|---|---|---|
| 2,080,722 | 5/37 | Lee | 29—235 X |
| 2,361,783 | 10/44 | McLaughlin | 29—235 |
| 2,998,049 | 8/61 | Winslow | 29—235 |

FOREIGN PATENTS 625,310   6/49   Great Britain.

WILLIAM FELDMAN, *Primary Examiner.*

WHITMORE A. WILTZ, *Examiner.*